April 7, 1959

E. J. HLINSKY 2,880,599

VIBRATION DAMPING GEAR

Filed July 15, 1957

INVENTOR.
Emil J. Hlinsky
BY
Murray A. Gleeson
ATTORNEY

United States Patent Office 2,880,599
Patented Apr. 7, 1959

2,880,599

VIBRATION DAMPING GEAR

Emil J. Hlinsky, La Grange Park, Ill., assignor to Goodman Manufacturing Company, Chicago, Ill., a corporation of Illinois Application July 15, 1957, Serial No. 671,819

2 Claims. (Cl. 64—27)

This invention relates to improvements in gears and more particularly relates to an improved form of vibration damping gear.

Heretofore, shock loads on a train of gears have been counteracted by utilizing a pair of gears spaced apart on a shaft, so that when the gears are subjected to shock loads, the shaft will twist and store up the applied energy. The energy stored up by twisting the shaft is restored to the shaft as the shaft unwinds and where the direction of the restoring force and the force of the shock loads coincide, a torsional displacement of destructive magnitude may frequently result.

Shock loads have also been counteracted by the use of a gear in the form of an annulus connected to a hub by means of pins secured in resilient bushings. While such systems and devices have been satisfactory, the device is limited in torque capacity to the torque that can be transmitted through the pins.

A principal object of the present invention is to remedy the disadvantages, heretofore, present in counteracting shock loads in gearing by incorporating circumferential resiliency into the structure of the gear and damping mechanical vibrations transmitted through the gear by absorbing the energy going to strain by the resiliency of the gear.

A further object of the invention is to provide a simple and novel form of vibration damping gear in which facing resilient elements in abutting engagement with each other operatively connect the gear to its hub and transmit torque loads from the gear to the hub and vice versa and damp vibration by the energy going to strain.

A still further object of the invention is to provide a vibration damping gear in which vibration is damped by the absorbing of shock loads by a plurality of resilient elements driving in shear and contained within the physical dimensions of the gear.

A still further object of the invention is to provide a simple and compact form of vibration damping gear in which alternately arranged driving and driven elements have interengagement between the gear and its hub, and in which the adjacent elements have driving and driven connection with each other through resilient disks placed under shearing stresses, as the gear and its hub are placed under the torque loads, and absorbing the shock loads through strain.

A still further object of the invention is to provide a vibration damping gear in which the gear is in the form of an annulus and is spaced radially from its hub by alternately arranged driving and driven elements having driving and driven engagement with the hub and the gear, and in which the driving and driven elements are spaced apart and bonded to resilient annular disks driving through shear and absorbing the shock loads under strain.

A still further and more specific object of the invention is to provide a simple and compact form of vibration damping gear in which alternately arranged non-resilient disks have interengagement with a hub and concentric aligned toothed annulus of a gear, in which the disks are spaced apart by annular disks of resilient material bonded to the non-resilient disks and transmitting relative circumferential displacement between the annulus and hub by shearing action through the resilient disks, and in which the ability of the gear to sustain shock loads may be varied by a variation in the thickness of the resilient disks and in the number of resilient and metallic disks.

These and other objects of the invention will appear from time to time as the following specification proceeds and with reference to the accompanying drawing wherein.

Figures 1, 2, 3, 4:
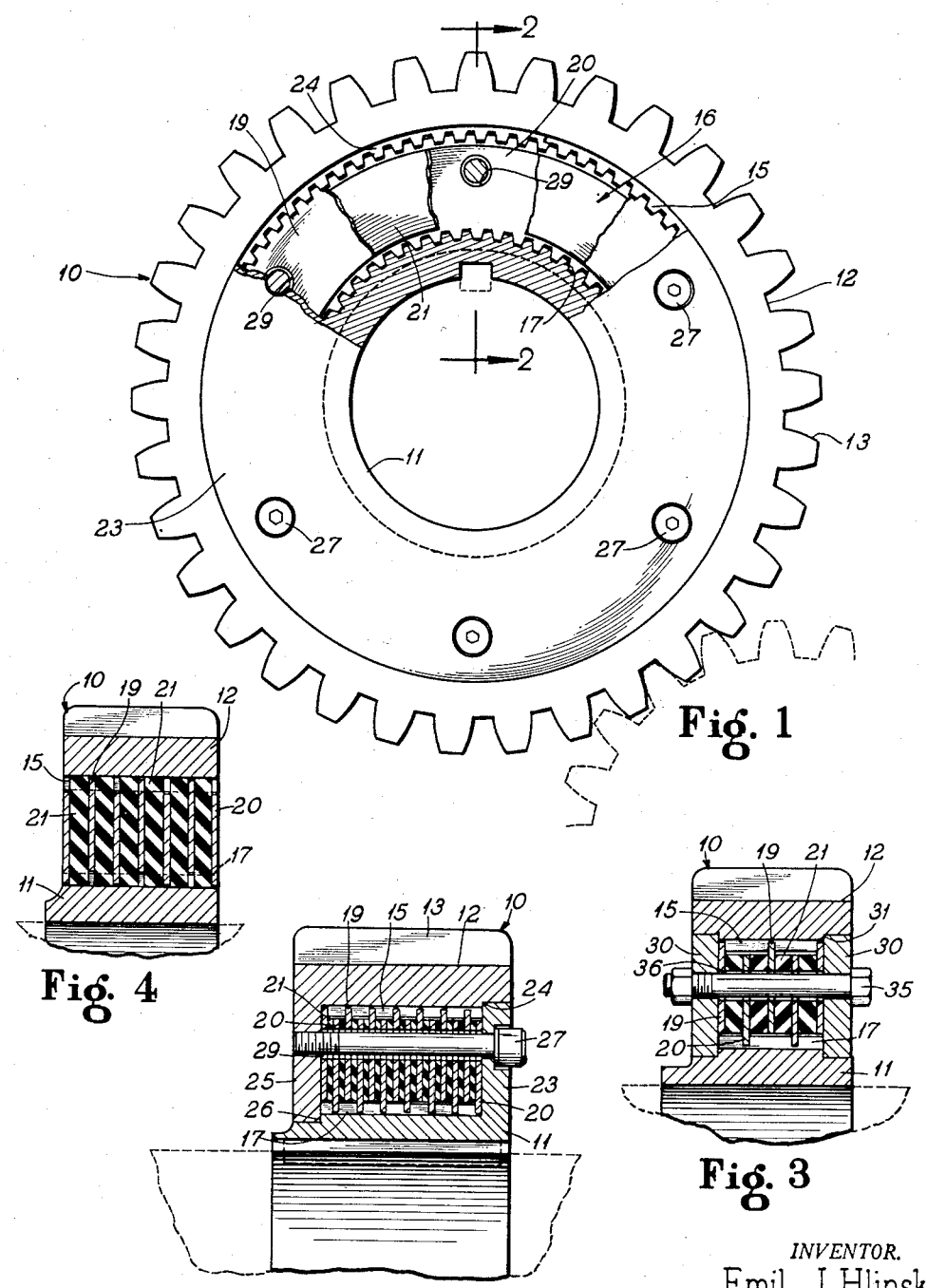
Figure 1 is a view in front elevation of a gear constructed in accordance with the invention with certain parts thereof broken away and certain other parts shown in section, in order to illustrate the principles of the present invention.
Figure 2 is a fragmentary sectional view taken through the gear shown in Figure 1 substantially along line 2—2 of Figure 1.
Figure 3 is a sectional view taken through a modified form of vibration damping gear constructed in accordance with the invention.
Figure 4 is a sectional view somewhat like Figures 2 and 3 and showing still another form in which the invention may be embodied.

In the embodiment of the invention illustrated in the drawing, I have shown a vibration damping gear 10 generally including a hub 11, an annular or ring gear 12 having gear teeth 13 cut in the outer periphery thereof, and having internal splines 15, adapted to have interengaging driving or driven connection with a resilient vibration damping assembly 16, shown as having interengagement with external splines 17 extending about the hub 11.

The vibration damping assembly 16 is shown in Figures 1 and 2 as comprising a plurality of externally splined disks 19 having engagement with the internal splines 15 of the ring gear 12, a plurality of internally splined disks 20 having engagement with the external splines 17 of the hub 11 and a plurality of resilient annular disks 21 spacing the disks 19 and 20 apart and transmitting the driving loads between the disks 19 and 20.

The resilient disks 21 may be made from rubber, an elastomer or from any other well known substitute for rubber, which will take and absorb the driving loads under shear with no slippage between the internally and externally splined disks 19 and 20, when clamped thereto.

While the annular disks 19, 20 and 21 may be clamped together with sufficient pressure to prevent slippage therebetween and to transmit the driving forces between alternate splined disks through the resilient disks under shear, with no slipping, a preferred structure is to assemble the splined disks 19 and 20, with the resilient disks 21 therebetween, in a fixture and to bond the respective disks 19 and 20 to the resilient disks 21 by heat and pressure. The resilient vibration damping assembly may then be assembled to the hub and gear to transmit the torque loads therebetween.

As shown in Figure 2, the hub 11 has a flange 23 extending radially from one end thereof, having engagement with an annular shouldered recess 24 formed in the inner periphery of the ring gear 12. The resilient assembly 16 may be placed on the hub 11 by sliding the internally splined disks 20 along the external splines 17 of the hub 11 and engaging the end splined disk with the inner face of the annular flange 23.

The gear 12 may also have an annular flange 25 extending radially inwardly therefrom at the end thereof opposite the annular flange 23 and adapted to have engagement with an annular shouldered recess 26 formed in the hub 11.

The flange 23 may be drilled at a plurality of circumferentially spaced points to receive cap screws 27, while the flange 25 may be drilled and threaded at a plurality of spaced points to have the cap screw 27 threaded therein. The drilled portions of the flange 23 may be of a larger diameter than the diameter of the cap screws 27 and the alternately arranged disks 19 and 20 and the resilient annular disks 21 therebetween may have passageways 29 extending therethrough to receive the cap screws 27. The passageways 29 are of a larger diameter than the cap screws 27 and accommodate relative movement between the disks 19 and 20 when the cap screws are in place to secure the hub and ring gear 12 in assembled relation with respect to each other.

With this construction, the drive is between the externally and internally splined disks 19 and 20 and the resilient disks disposed therebetween, the resilient disks accommodating circumferential displacement between the ring gear and its hub under shock conditions and transmitting the torque loads under shear. The resilient disks 21 absorb vibration or oscillation caused by sudden shock loads, by accommodating circumferential displacement between the ring gear and its hub and absorbing a portion of the energy which goes to strain the resilient disks and therefore is not restored to the system, but instead damps the oscillations imposed on the system.

In the modified form of the invention illustrated in Figure 3, the damping principle is the same as in the form of the invention illustrated in Figures 1 and 2 and the internally and externally splined disks and resilient annular disks disposed therebetween are of the same general construction, so the same part numbers will be applied to the hub, the ring gear, the internally and externally splined disks, and the resilient annular disks disposed therebetween as were applied in Figures 1 and 2. In this form of the invention, the resilient assembly may be assembled and retained as a resilient drive unit by bonding the resilient disks 21 to the alternate externally and internally splined disks 19 and 20 respectively. The resilient assembly 16 may be meshed with the external splines 17 and internal splines 15 of the hub and ring gear, respectively, and may be retained to the hub and ring gear by annular end plates 30. The annular end plates 30 engage the outer splined disks 19 and are shown as abutting annular shoulders 31 formed in opposite ends of the inner periphery of the ring gear 12.

The annular end plates 30 are secured into abutting engagement with the end splined disks 19 as by bolts 35 extending through said end plates and through passageways 36 in the resilient assembly 16. The passageways 36 are of a larger diameter than the diameters of the bolts 35, to accommodate relative circumferential displacement between the internally and externally splined disks 19 and 20 through the resilient disks 21.

It should here be noted that the resilient disks 21 are shown as being substantially thicker than the similar resilient disks 21 shown in Figure 2. This accommodates a greater circumferential displacement between the internally and externally splined disks 19 and 20 respectively and therefore increases the amplitude of the damping motion, but is not capable of transmitting as great a torque load as the thinner and more numerous disks shown in Figure 2.

It may here be seen from a comparison of Figures 2 and 3, that the amplitude of the damping motion, and the torque that can be transmitted by the gear or shaft may be determined by the simple parameters of the thickness of the resilient disks and the number of resilient disks provided in the resilient assembly.

In the form of the invention illustrated in Figure 4, the respective externally and internally splined disks 19 and 20 may be assembled on the hub 11 and within the ring gear 12 with the resilient annular disks 21 disposed therebetween. The entire assembly may then be subjected to a bonding process by the application of the heat and pressure to the resilient assembly. This will result in the bonding of the resilient disks 21 to the alternate splined disks 19 and 20 and in the bonding of the resilient assembly to the hub 11 and the ring gear 12, and will maintain a radially fixed relation of the hub and ring gear and all of the parts of the resilient assembly with respect to each other. With such an assembly, the need for end plates between the gear and hub is obviated and a simple form of vibration damping gear is provided, damping by the taking of the torque loads through the resilient disks 21 under shear and the absorption of the vibrational energy under strain.

It may be seen from the foregoing that with the various forms vibration damping gears illustrated, that high torque capacity is attained with a minimum amount of circumferential displacement between the hub and gear, with a resultant reduction in lag between the hub and gear and the provision of a vibration damping gear particularly adapted for gear trains which drive parts which operate in timed sequence with respect to each other.

It should further be understood that the resilient assembly 16 overcomes vibration because its frequency of oscillation is in such a range that there can be no compounding of the oscillation of the resilient assembly with the other components in the system, and because the nature of the resilient materials is such that the energy going to strain the material is lost and is not restored to the system.

While I have herein shown and described a number of modifications in which the invention may be embodied, it should be understood that I do not wish to be construed as limiting myself to the specific embodiments shown, and that various other modifications and variations in the invention may be attained without departing from the spirit and scope of the present invention.

I claim as my invention:

1. In a vibration damping gear, a hub, a ring gear concentric with said hub and spaced radially therefrom, said ring gear being internally splined and said hub being externally splined, a flange extending radially from said hub adjacent one end thereof and having engagement with said ring gear, a flange extending radially inwardly from said ring gear adjacent the opposite end of said ring gear from said flange extending from said hub, and adapted to have engagement with said hub, a vibration damping assembly comprising a plurality of alternately arranged internally and externally splined non-resilient disks, annular resilient disks spacing said non-resilient disks apart and bonded thereto, said internally and externally splined non-resilient disks having driving engagement with the splines in said hub and ring gear, and through bolts extending through said flanges and radially spaced from said vibration damping assembly and connecting said ring gear and hub together and accommodating limited circumferential movement of said ring gear with respect to said hub.

2. A vibration damping gear comprising an externally splined hub having annular shoulders adjacent each end thereof, an internally splined ring gear concentrically disposed about said hub and spaced radially therefrom, and having annular shoulders adjacent each end thereof in alignment with the shoulders of said hub, a pair of annular end plates each engaged with said shoulders and hub in said ring gear, and a resilient damping assembly engaged respectively with the splines of said hub and said ring gear and located between said end plates, said resilient damping assembly including a plurality of non-resilient disks alternately engaged with the splines of said hub and said ring gear and resilient annular disks spacing said non-resilient annular disks apart and bonded thereto, and connecting means extending through said annular end plates and said damping assembly and maintaining said ring gear and hub and said resilient damping assembly in connected relation with respect to each other and accommodating circumferential displacement between said ring gear and said hub.

References Cited in the file of this patent

UNITED STATES PATENTS

| | | |
|---|---|---|
| 1,427,025 | Schalafly | Aug. 22, 1922 |
| 1,804,906 | Wemp | May 12, 1931 |
| 2,093,420 | Creager | Sept. 21, 1937 |

FOREIGN PATENTS

| | | |
|---|---|---|
| 157,559 | Austria | Dec. 11, 1939 |